US010725493B2

(12) United States Patent
Hudlemeyer et al.

(10) Patent No.: US 10,725,493 B2
(45) Date of Patent: Jul. 28, 2020

(54) FOOT PEDAL ASSEMBLY

(71) Applicant: Brunson Instrument Company, Kansas City, MO (US)

(72) Inventors: Aaron A. Hudlemeyer, Jemez Springs, NM (US); Mark J. Meuret, Overland Park, KS (US)

(73) Assignee: Brunson Instrument Company, Kansas City, MO (US)

( * ) Notice: Subject to any disclaimer, the term of this patent is extended or adjusted under 35 U.S.C. 154(b) by 0 days.

(21) Appl. No.: 16/112,299

(22) Filed: Aug. 24, 2018

(65) Prior Publication Data

US 2019/0064869 A1 Feb. 28, 2019

Related U.S. Application Data

(60) Provisional application No. 62/549,504, filed on Aug. 24, 2017.

(51) Int. Cl.
*G05G 5/06* (2006.01)
*G05G 1/46* (2008.04)
(Continued)

(52) U.S. Cl.
CPC .............. *G05G 5/06* (2013.01); *B60B 29/001* (2013.01); *B60B 33/066* (2013.01); *B60T 1/14* (2013.01);
(Continued)

(58) Field of Classification Search
CPC ............ G05G 1/30; G05G 1/44; G05G 1/445; G05G 1/46; G05G 5/02; G05G 5/06;
(Continued)

(56) References Cited

U.S. PATENT DOCUMENTS

2006/0248978 A1* 11/2006 Prat Terradas .......... B60T 7/102
74/560
2009/0174162 A1* 7/2009 Gass ....................... B25H 1/04
280/79.11
(Continued)

FOREIGN PATENT DOCUMENTS

KR 1020140063995 A 12/2018

OTHER PUBLICATIONS

International Search Report for PCT/US2018/048002 dated Dec. 18, 2018.

*Primary Examiner* — Prasad V Gokhale
(74) *Attorney, Agent, or Firm* — Kutak Rock LLP; Brian L. Main

(57) ABSTRACT

A foot pedal assembly and method of moving a wheel assembly from a stowed configuration to a deployed configuration is provided. The foot pedal assembly can be moved to a locked configuration, thereby securing the wheel assembly in a deployed configuration, by allowing a foot pedal of the foot pedal assembly to move away from a second position after moving the foot pedal from a first position to the second position. When in the locked configuration, the foot pedal assembly can be moved to an unlocked configuration by moving the foot pedal assembly back to the second position, thereby allowing the foot pedal assembly and the wheel assembly to move towards the first configuration and the stowed configuration, respectively. A pin extending from a cam assembly into a raceway of a raceway body travels through the raceway as the foot pedal assembly is moved between configurations.

22 Claims, 6 Drawing Sheets

(51) Int. Cl.
*B60B 33/06* (2006.01)
*G05G 5/08* (2006.01)
*B60T 1/14* (2006.01)
*B60T 7/06* (2006.01)
*G05G 1/44* (2008.04)
*B60B 29/00* (2006.01)

(52) U.S. Cl.
CPC ............... *B60T 7/06* (2013.01); *G05G 1/44* (2013.01); *G05G 1/46* (2013.01); *G05G 5/08* (2013.01); *B60B 2900/325* (2013.01); *G05G 2505/00* (2013.01); *G05G 2700/14* (2013.01)

(58) Field of Classification Search
CPC .... G05G 5/08; G05G 2505/00; B60B 29/001; B60B 30/00; B60B 33/04; B60B 33/045; B60B 33/06; B60B 33/063; B60B 33/066; F16H 53/00; F16H 53/02; F16H 53/06; F16M 11/24; F16M 11/42
See application file for complete search history.

(56) References Cited

U.S. PATENT DOCUMENTS

| | | |
|---|---|---|
| 2012/0024329 A1 | 2/2012 | Ma |
| 2015/0153760 A1* | 6/2015 | Kim .................. G05G 1/44 74/512 |
| 2015/0267860 A1 | 9/2015 | Schutz et al. |
| 2016/0258573 A1 | 9/2016 | Goldish et al. |
| 2017/0114563 A1* | 4/2017 | Ye .................. A45B 11/00 |

* cited by examiner

FOOT PEDAL ASSEMBLY

CROSS-REFERENCE TO RELATED APPLICATIONS

This application claims priority pursuant to 35 U.S.C. 119(e) to U.S. Provisional Patent Application Ser. No. 62/549,504, filed Aug. 27, 2017, the entire disclosure of which is incorporated herein by reference.

FIELD OF THE INVENTION

The present invention relates generally to foot pedal assemblies. More specifically, the present invention is concerned with a foot pedal assembly for moving mobile stand wheel assemblies between stowed and deployed configurations.

BACKGROUND

A large number of industries require precise and accurate measuring for a number of applications such as production, manufacturing, and process control. In many such applications, measurement errors on the order of even one ten-thousandth of an inch can be critical. Instruments such as laser trackers, scanners, imaging devices, associated targets and the like are particularly well suited for such applications because they provide extreme precision and accuracy. Often, such instruments include or are otherwise installed to or placed on one or more support structure such as equipment stands and similar support structures now known or later developed (hereinafter "stands").

Often, stands are required to hold instruments steady and in position during use. In some instances, however, it is desirable for these stands to be moveable without adversely affecting the stability of the stands when they are stationary. Consequently, many such stands employ a retractable wheel assembly in which casters, wheels, or other mobility devices now known or later developed (hereinafter "wheels") are moveable between a stowed configuration and a deployed configuration. In the stowed configuration, the wheels do not adversely affect the stability of the stand. In the deployed configuration, the wheels facilitate mobility of the stand.

Many retractable wheel assemblies employ a foot pedal assembly to move the wheel assembly between the stowed and deployed configurations and a locking plate to secure the wheel assembly in the deployed configuration. As shown in FIGS. 1A through 1G, the foot pedal assembly includes a foot pedal that is rotatable between an upper position, corresponding with the stowed configuration of the wheel assembly, and a lower position, corresponding with the deployed configuration of the wheel assembly. While the foot pedal is in the lower position, the locking plate is movable relative to a locking pin from a disengaged configuration to an engaged configuration. When the foot pedal is in the lower position and the locking plate is in the engaged configuration, the foot pedal assembly can be moved to a locked configuration by allowing the foot pedal to rotate slightly away from the lower position, thereby securing the locking plate to the locking pin and securing the wheel assembly in the deployed configuration. The foot pedal assembly can be moved from the locked configuration to an unlocked configuration by reversing the steps, thereby allowing the wheel assembly to be moved from the deployed configuration to the stowed configuration.

While the foot pedal assembly of the prior art provides many advantages for the use of a variety of stands, it can be difficult to coordinate movement of the foot pedal and locking plate as the foot pedal assembly is moved between the locked and unlocked configurations and/or as the wheel assembly is moved between the stowed and deployed configurations. Consequently, it would be beneficial to have a foot pedal assembly that is capable of securing a wheel assembly in a deployed configuration and/or that is capable of moving the wheel assembly between deployed and stowed configurations without requiring a user to coordinate movement of a foot pedal and a locking plate.

SUMMARY

The present invention comprises a lever assembly such as a foot pedal assembly (hereinafter "foot pedal assembly") having a lever such as a foot pedal (hereinafter "foot pedal") that is moveable between a first position and a second position, thereby moving the foot pedal assembly between respective first and second configurations. The foot pedal assembly is configured to be secured to a stand and engaged with a wheel assembly such that moving the foot pedal assembly between first and second configurations causes the wheel assembly to move between respective stowed and deployed configurations.

After initially moving the foot pedal from its first position to its second position, the foot pedal assembly is capable of securing the wheel assembly in a deployed configuration by moving the foot pedal (or more appropriately in some embodiments, allowing the foot pedal to move) slightly away from its second position, thereby moving the foot pedal assembly to a locked configuration. While the foot pedal assembly is in the locked configuration, moving the foot pedal assembly back to its second position causes the foot pedal assembly to move to an unlocked configuration, thereby allowing the foot pedal to move back to its first position, thereby causing and/or allowing the foot pedal assembly to move to its first configuration and/or causing and/or allowing the wheel assembly to move to its stowed configuration.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1A:
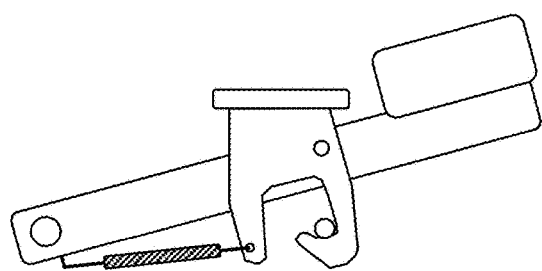
FIG. 1A through 1G are side views of a prior art design of a foot pedal utilizing a locking plate in various configurations as the foot pedal is moved between first and second positions.
Figure 1E:
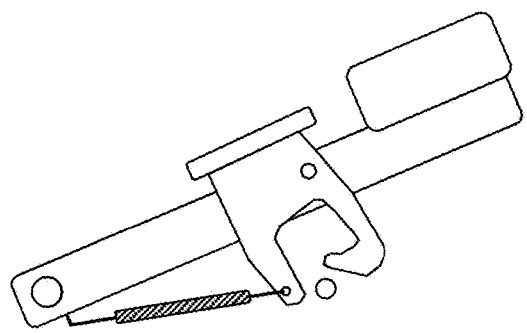
Figure 1B:
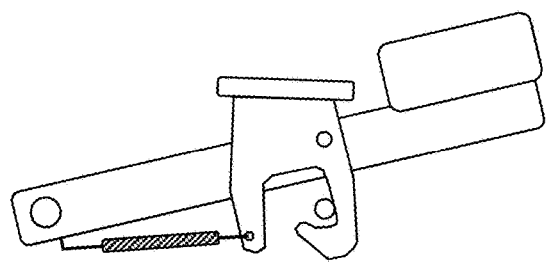
Figure 1C:
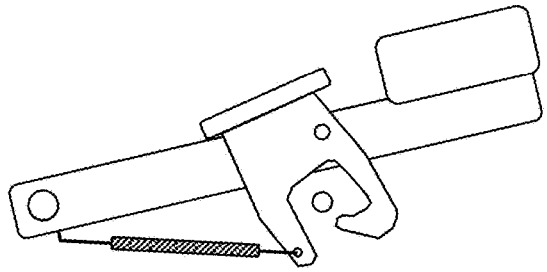
Figure 1F:
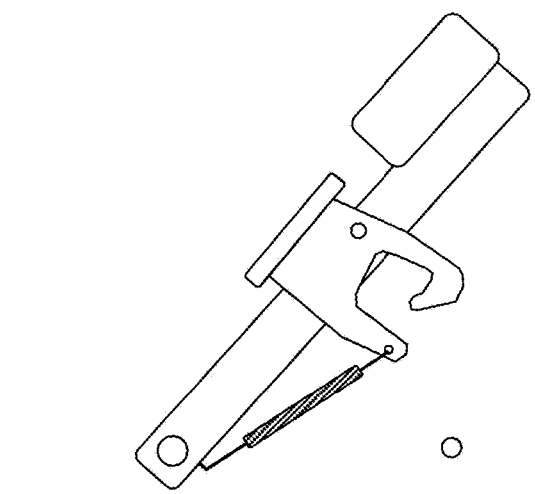
Figure 1D:
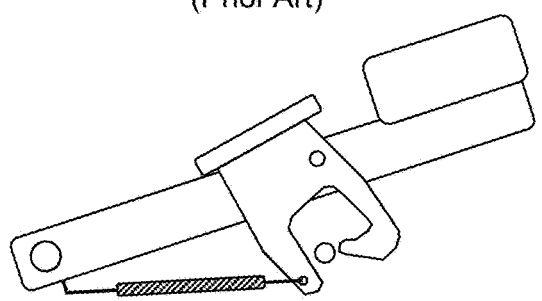
Figure 1G:
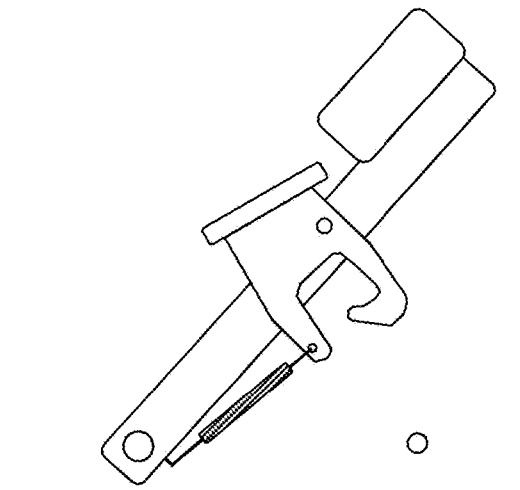
Figure 2:
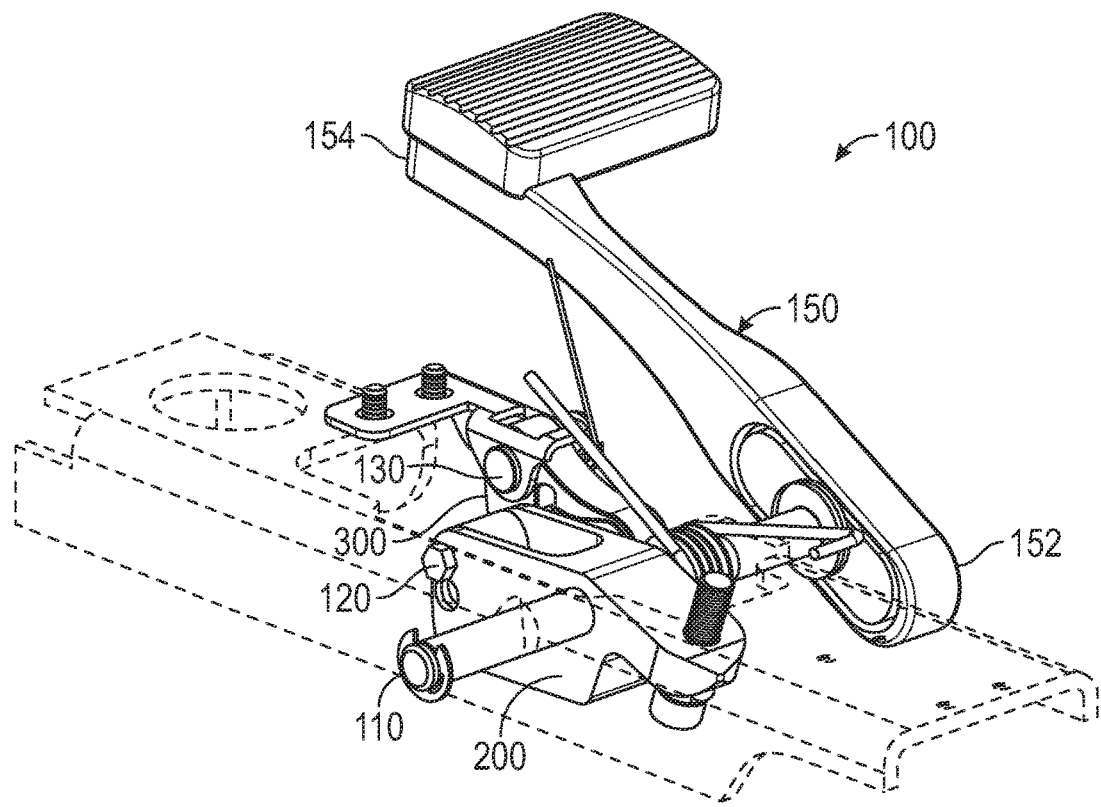
FIG. 2 is a perspective view of a portion of an embodiment of the foot pedal assembly of the present invention.

Referring to FIG. 2, the foot pedal assembly 100 of the present invention includes a foot pedal 150 that is moveable between a first position and a second position. In some embodiments, the foot pedal 150 is rotatably moveable from the first position to the second position by applying a vertical downward force on a distal end 154 of the foot pedal so as to cause the foot pedal to rotate about a proximal end 152 of the foot pedal. In some such embodiments, the foot pedal is secured to a first pin 110 at or near a proximal end of the foot pedal such that the foot pedal rotates about a central axis of the first pin as the foot pedal is rotated or otherwise moved between first and second positions. In this way, the foot pedal is capable of being secured to a stand 10 such that it is engaged with a wheel assembly 20.

Figure 3:
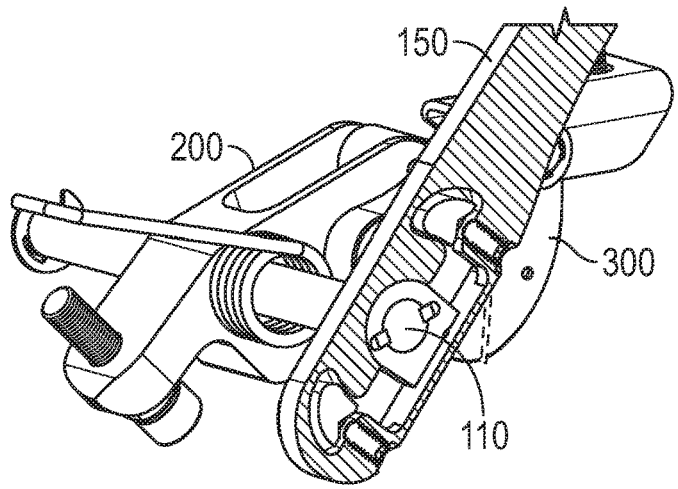
FIG. 3 is a perspective view of a portion of the foot pedal assembly of FIG. 2, shown from a different angle as FIG. 2.
Figure 4:
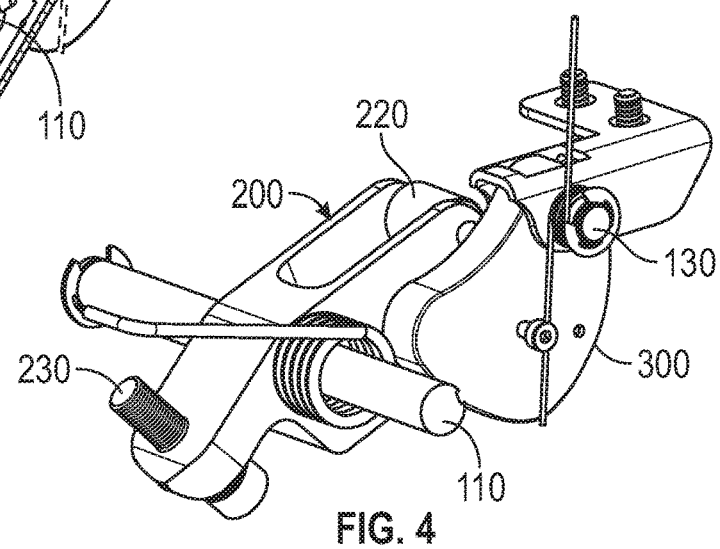
FIG. 4 is the perspective view of FIG. 3 with the foot pedal removed for clarity.
Figure 5:
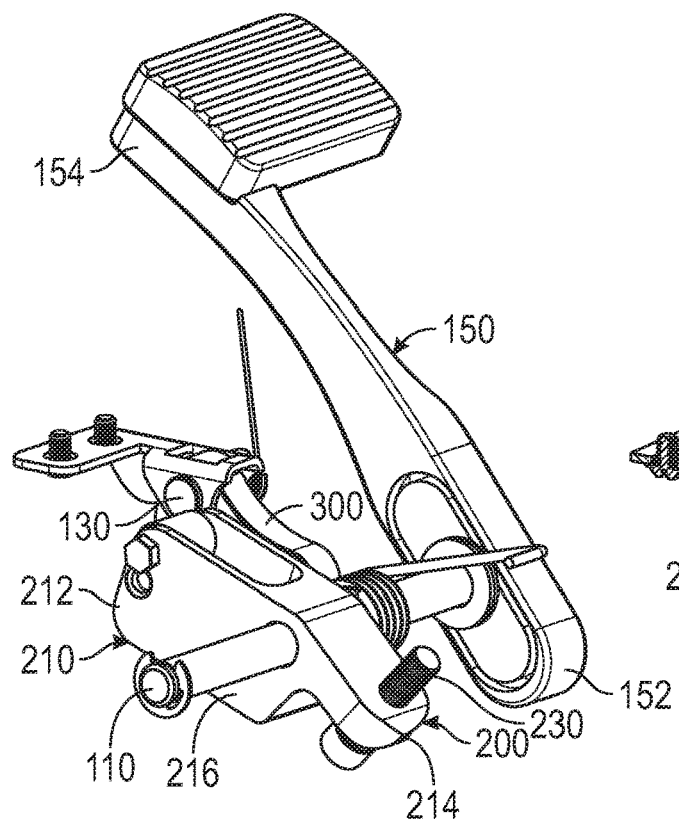
FIG. 5 is a perspective view of a portion of the foot pedal assembly of FIG. 2, the foot pedal assembly shown in a first configuration.
Figure 6:
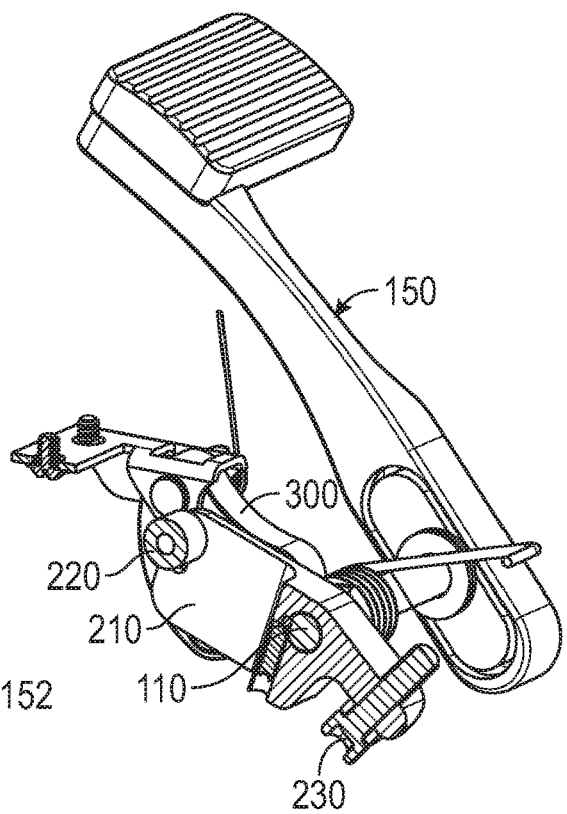
FIG. 6 is the perspective view of FIG. 5 with a cam assembly and a first pin cut and partially removed for clarity.
Figure 7:
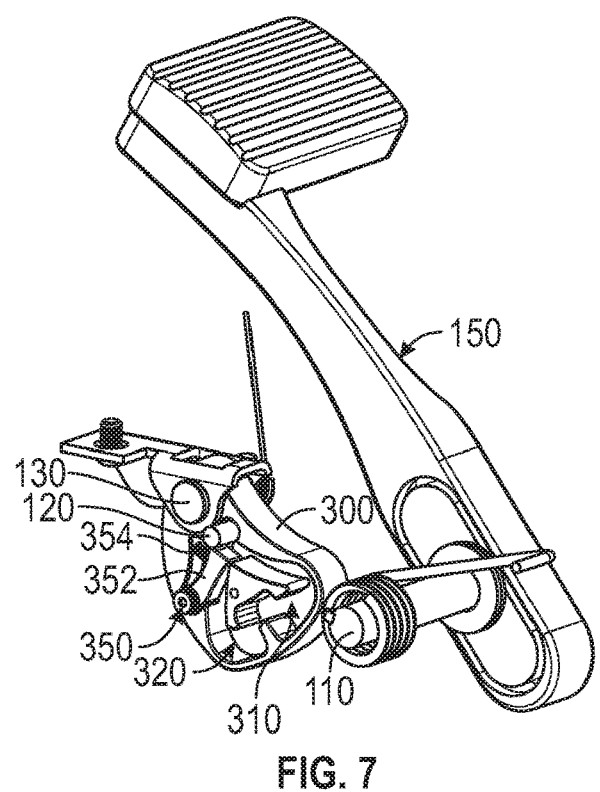
FIG. 7 is the perspective view of FIG. 6 with the cam assembly removed for clarity.
Figure 8:
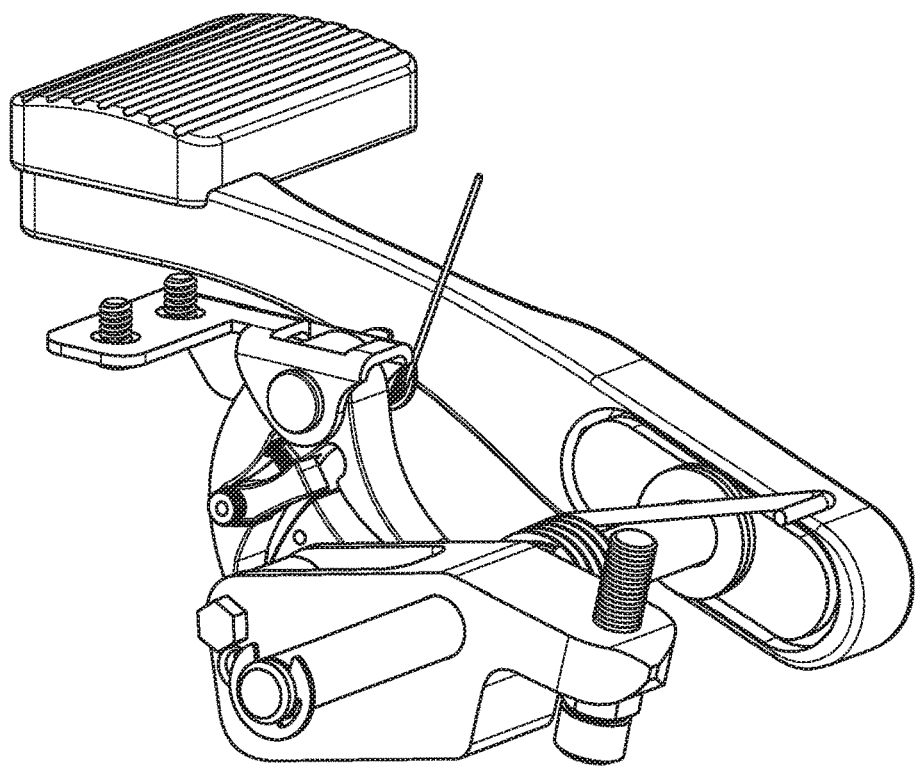
FIG. 8 is a perspective view of a portion of the foot pedal assembly of FIG. 2, the foot pedal assembly shown in a second configuration.
Figure 9:
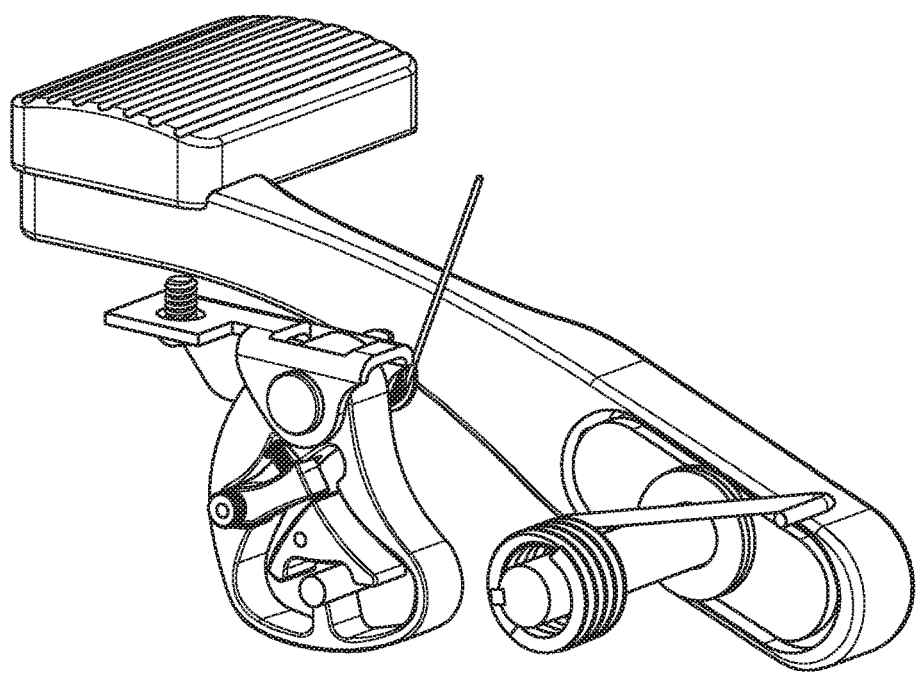
FIG. 9 is the perspective view of FIG. 8 with a cam assembly removed for clarity.
Figure 10:
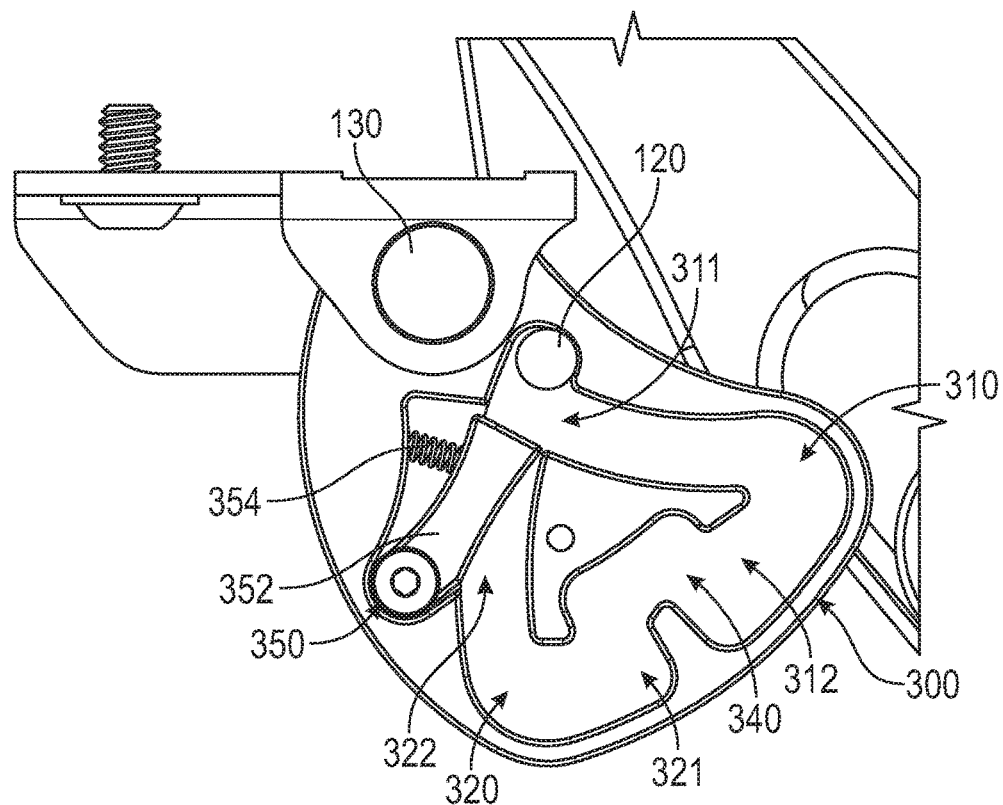
FIG. 10 is a side elevation view of a raceway body of the present invention shown as part of a foot pedal assembly of the present invention, the foot pedal assembly being in a first configuration such that a second pin of the foot pedal assembly extends into a first recessed area of the raceway body.
Figure 11:
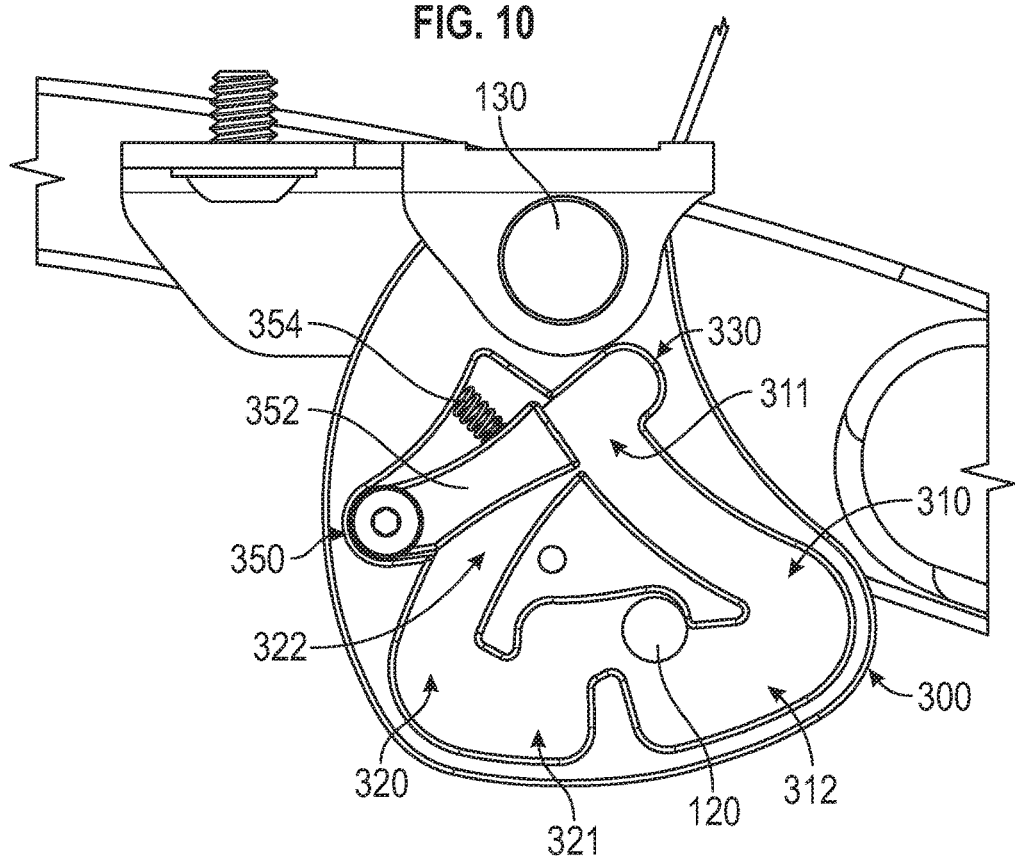
FIG. 11 is a side elevation view of a raceway body of the present invention shown as part of a foot pedal assembly of the present invention, the foot pedal assembly being in a second configuration such that a second pin of the foot pedal assembly extends into a second recessed area of the raceway body.
Figure 12:
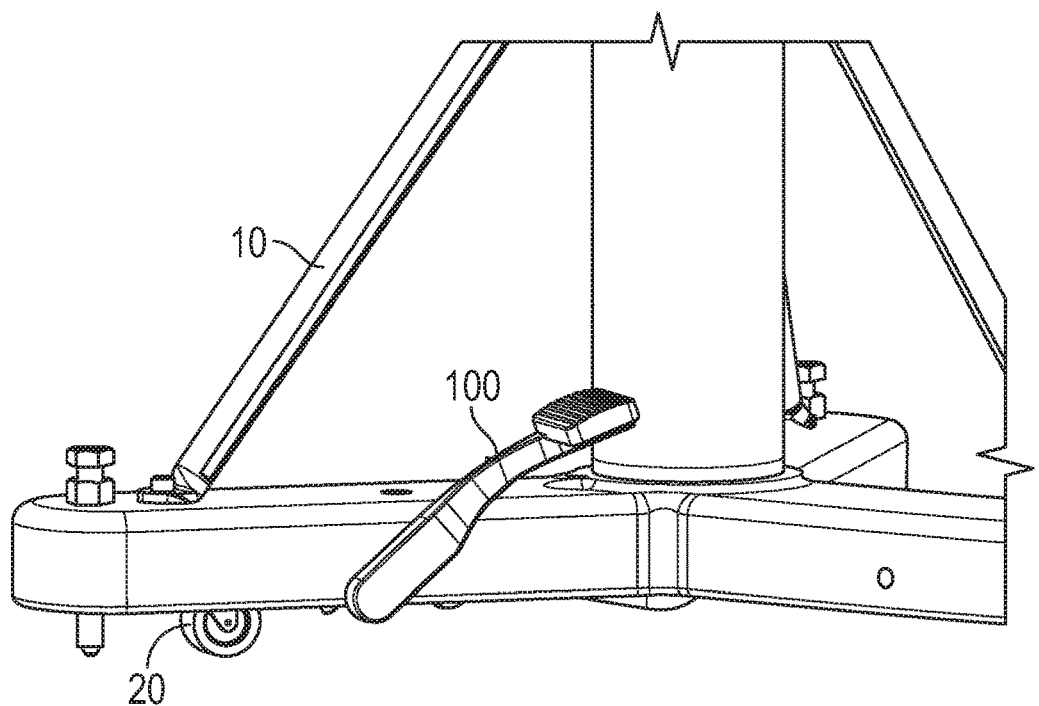
FIG. 12 is a perspective view of an embodiment of the foot pedal assembly installed onto a stand having a wheel assembly.
Figure 13:
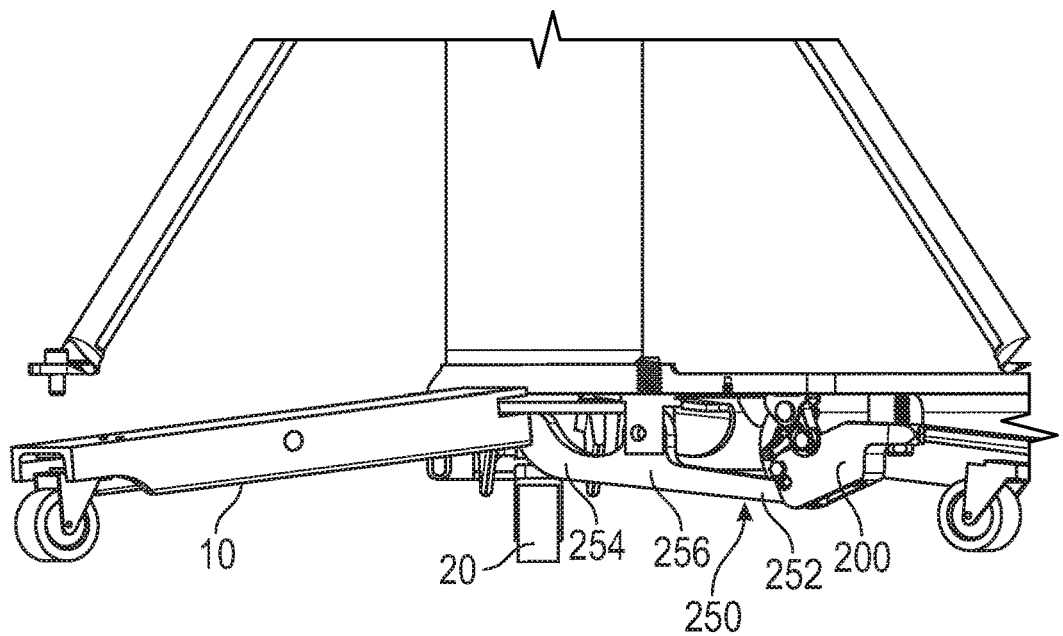
FIG. 13 is a partially-exploded view of the stand of FIG. 12 shown from a different angle as FIG. 12 with the shroud removed to show details of the foot pedal assembly.

In some embodiments, the foot pedal assembly 100 further includes a cam assembly 200 having a cam lever 210 that is moveable between a first position and a second position. In some such embodiments, the cam lever 210 is secured to the first pin 110 such that the cam lever is moved between its first and second positions as the foot pedal 150 is moved between its respective first and second positions. In some embodiments, the cam lever 210 includes first 212 and second 214 portions extending from opposed ends of a third 216 portion, the third portion 216 being configured to receive the first pin 110. In some such embodiments, a stop member 230 extending from the second portion 214 of the cam lever 210 is configured to interface with the stand 10 so as to counteract a force applied to the first portion 212 of the cam lever 210, thereby limiting motion of the cam lever 200 and/or preventing damage to the foot pedal assembly 100. In some such embodiments, the stop member 230 is adjustable for adjustments of position of the mechanism. This helps with manufacturing variation. In some embodiments, an adjustment feature is included with the foot pedal lever 150. In some embodiments the stop member 230 can cause variation in the pedal position and manufacturing tolerances create variation. Thus, the adjustment feature of some embodiments of the foot pedal 150 allows for adjustment of the pedal lever 150 position so that all the stands can be consistent. In some embodiments, the adjustment feature of the pedal lever 150 is a "rocker" design, as shown in the cut away of FIG. 3. In the embodiment shown in FIG. 3, the two opposing set screws in pedal lever 150 allow small angular adjustment of pedal lever 150 about pin 110.

In some embodiments, the first portion 212 of the cam lever 210 defines a channel and/or one or more other feature to facilitate interfacing with a first portion 252 of a rocker arm 250 of the foot pedal assembly 100. In other embodiments, the cam assembly 200 includes one or more interface member 220, such as a roller (hereinafter "roller"). In some such embodiments, the roller 220 is displaced from the first pin 110 such that moving the cam lever 210 between its first and second positions causes the roller 220 to move between its own respective first and second positions. In this way, the foot pedal assembly 100 is moveable between a first configuration, wherein each of the foot pedal 150, the cam lever 210, and the roller 220 are in their respective first positions, and a second configuration, wherein each of the foot pedal 150, the cam lever 210, and the roller 220 are in their respective second positions.

In some embodiments, the rocker arm 250 further includes a second portion 254 for interfacing with the wheel assembly 20 and a third portion 256 for interfacing with the stand 10. In some embodiments, the third portion 256 is rotatably pinned to the stand 10 and the first 252 and second 254 portions extend from opposed ends of the third portion 256 so as to cause the wheel assembly 20 to move between a stowed configuration and a deployed configuration as the foot pedal assembly 100 is moved between respective first and second configurations. In some such embodiments, the first portion 252 is longer than the second portion 254 so as to create a mechanical advantage when using the foot pedal assembly 100 to cause the wheel assembly 20 to move between stowed and deployed configurations.

In some embodiments, the foot pedal assembly 100 further includes a raceway body 300 defining first 310 and second 320 portions of a raceway. In some such embodiments, the raceway is configured to receive a second pin 120 of the foot pedal assembly 100. In some embodiments, the second pin 120 of the foot pedal assembly 100 extends from the cam lever 210 of the cam assembly 200 into the raceway of the raceway body 300 such that the second pin 120 is caused to travel through the raceway as the foot pedal assembly 100 is moved between the first and second configurations. In some embodiments, the raceway body 300 is secured to the stand 10. In some such embodiments, the raceway body 300 is secured to the stand with a third pin 130 so as to enable the raceway body 300 to rotate relative to the third pin 130 as the second pin 120 travels through the raceway.

In some embodiments, the raceway body 300 further defines a first recessed area 330 positioned at a first end 311 of the first portion 310 of the raceway. The first recessed area 330 is configured to receive the second pin 120 when the foot pedal assembly 100 is in its first configuration, thereby securing the foot pedal assembly 100 in the first configuration. In some such embodiments, the first recessed area 330 is configured such that a user can cause the second pin 120 to move out of the first recessed area 330 and into the first portion 310 of the raceway by moving the foot pedal 150 from its first position, such as by stepping on the foot pedal 150 when the foot pedal assembly 100 is in the first configuration. In some such embodiments, moving the foot pedal assembly 100 from the first configuration towards the second configuration causes the second pin 120 to travel from a first end 311 of the first portion 310 of the raceway towards a second end 312 of the first portion 310 of the raceway. In some embodiments, the second pin 120 is positioned at the second end 312 of the first portion 310 of the raceway when the foot pedal assembly 100 is in the second configuration.

In some embodiments, retaining the foot pedal 150 in its second position causes the second pin 120 to remain at the second end 312 of the first portion 310 of the raceway. In some such embodiments, allowing the foot pedal 150 to move slightly away from its second position causes the second pin 120 to move from the second end 312 of the first portion 310 of the raceway into a second recessed area 340 that is in communication with the first 310 and second 320 positions of the raceway. In some such embodiments, the second recessed area 340 is positioned at or adjacent to, and/or is at least partially defined by, the second end 312 of the first portion 310 of the raceway and/or a first end 321 of the second portion 320 of the raceway. In this way, the second pin 120 and the raceway are configured so as to secure the foot pedal assembly in a third configuration that is substantially similar to the second configuration, thereby enabling the foot pedal assembly 100 to secure the wheel assembly in a deployed configuration. In some such embodiments, the foot pedal 150 is in a third position when the foot pedal assembly 100 is in the third configuration, the third position of the foot pedal 150 being substantially similar to the second position of the foot pedal 150.

In some embodiments, moving the foot pedal 150 from the third position towards the second position causes the second pin 120 to move from the second recessed area 340 into the first end 321 of the second portion 320 of the raceway. In some such embodiments, retaining the foot pedal 150 in the second position causes the second pin 120 to remain at the first end 321 of the second portion 320 of the raceway. In other such embodiments, moving the foot pedal 150 from the second position towards the first position causes the second pin 120 to move through the second portion 320 of the raceway towards the second end 322 of the second portion 320 of the raceway. In some such embodiments, the first recessed area 330 is positioned at or adjacent to, and/or is at least partially defined by, the second end 322 of the second portion 320 of the raceway and/or the first end 311 of the first portion 310 of the raceway such that moving the foot pedal 150 to the first position causes the second pin 120 to move into the first recessed area 330, thereby securing the foot pedal assembly 100 in the first configuration.

The foot pedal assembly 100 is configured such that the second pin 120 travels generally in a continuous first direction along the raceway. In some embodiments, the foot pedal assembly 100 includes one or more feature 350, such as a mechanical switch assembly (hereinafter "mechanical switch"), for preventing the second pin 120 from traveling in a second direction along the raceway while causing, or at least allowing, the second pin 120 to travel in the first direction. In some such embodiments, the mechanical switch 350 includes a switch member 352 that is moveable between an extended configuration and a retracted configuration. In some embodiments, the foot pedal assembly 100 further includes a biasing member 354, such as a spring, for biasing the switch member 352 towards the extended configuration.

In some embodiments, the second pin 120 is prevented from moving in the second direction when the switch member 352 is in the extended configuration. In some such embodiments, the switch member 352 is positioned at or adjacent to the first end 311 of the first portion 310 of the raceway so as to guide the second pin 120 into the first portion 310 of the raceway as the second pin 120 moves from the first recessed area 330. In other such embodiments, the switch member 352 is positioned at or adjacent to the second end 322 of the second portion 320 of the raceway so as to prevent the second pin 120 from entering the second portion 320 of the raceway as the second pin 120 moves from the first recessed area 330. In some embodiments, the mechanical switch 350 is configured so as to allow the second pin 120 to travel past the switch member 352 as the second pin 120 travels from the second portion 320 of the raceway towards the first portion 310 of the raceway. In some such embodiments, the mechanical switch 350 is configured such that the switch member 352 moves away from the blocking configuration and/or towards the stowed In use, the foot pedal assembly 100 is configured to allow a user to move a wheel assembly 20 of a stand 10 between stowed and deployed configurations by moving the foot pedal assembly 100 between respective first and second positions. In this way, wheels are capable of being selectively deployed when they are needed and/or when mobility of the stand is required and selectively stowed when they are not needed and/or when stability of the stand is required. In some embodiments, the foot pedal assembly 100 is further configured to move to a locked configuration by allowing the foot pedal assembly 100 to move slightly away from the second configuration, thereby securing the wheel assembly in a deployed configuration. In other embodiments, the foot pedal assembly 100 is further configured to move to an unlocked configuration by moving the foot pedal assembly 100 from the locked configuration towards the second configuration prior to moving the foot pedal assembly 100 towards the first position, thereby moving the wheel assembly 20 from the deployed configuration towards the stowed configuration.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A stand (10) comprising:
   a retractable wheel assembly (20) moveable between a stowed configuration and a deployed configuration; and
   a foot pedal assembly (100) for moving said wheel assembly between its stowed and deployed configurations, said foot pedal assembly comprising:
      a foot pedal (150) having opposed proximal (152) and distal (154) ends;
      a first pin (110) coupled to said proximal end of said foot pedal;
      a cam assembly (200) having a cam lever (210) coupled to said first pin;
      a second pin (120) extending from a first portion (212) of said cam lever; and
      a raceway body (300) defining a raceway and first (330) and second (340) recessed areas, a first portion (310) of said raceway extending from said first recessed area and a second portion (320) of said raceway extending from said second recessed area, wherein said second pin is configured to extend into said raceway and said recessed areas,
   wherein said second pin is received by said first recessed area when said foot pedal is in a first configuration,
   wherein said second pin is received by said second recessed area when said foot pedal is in a second configuration,
   wherein imparting a first downward force onto said distal end of said foot pedal when said foot pedal assembly is in its first configuration causes said foot pedal assembly to move towards its second configuration, thereby moving said wheel assembly towards its deployed configuration, and
   wherein imparting a second downward force onto said distal end of said foot pedal when said foot pedal assembly is in its second configuration causes said foot pedal assembly to move away from its second configuration, thereby facilitating movement of said wheel assembly away from its deployed configuration.

2. The stand of claim 1, wherein moving said foot pedal assembly from its first configuration towards its second configuration comprises moving said second pin from said first recessed area into a first end (311) of said first portion of said raceway and moving said second pin through said raceway towards a second end (312) of said first portion of said raceway.

3. The stand of claim 2, wherein said second end of said first portion of said raceway is in communication with said second recessed area and wherein said foot pedal assembly is configured such that said second pin moves from said second end of said first portion of said raceway into said second recessed area upon the first downward force being removed from said distal end of said foot pedal.

4. The stand of claim 3, wherein a first end (321) of said second portion of said raceway is in communication with said second recessed area and wherein said foot pedal assembly is configured such that said second pin moves from said second recessed area into said second portion of said raceway through said first end of said second portion upon the second downward force being applied to said distal end of said foot pedal.

5. The stand of claim 4, wherein a second end (322) of said second portion of said raceway is in communication with said first recessed area and wherein said foot pedal assembly is configured such that said second pin moves from said second end of said second portion of said raceway into said first recessed area upon the second downward force being removed from said distal end of said foot pedal.

6. The stand of claim 5, wherein said raceway body comprises a switch assembly (350) that is configured to prevent said second pin from entering said second portion of said raceway upon the first downward force being applied to said distal end of said foot pedal.

7. The stand of claim 6, wherein said switch assembly comprises a switch member (352) that is movable between extended and retracted configurations, said switch member being configured to prevent said second pin from entering said second portion of said raceway when said switch member is in the extended configuration.

8. The stand of claim 7, wherein said switch assembly further comprises a biasing member (354) for biasing said switch member towards its extended configuration.

9. The stand of claim 8, wherein said foot pedal assembly is configured such that said second pin biases said switch member towards its retracted configuration as said second pin travels past said switch member towards said first recessed area.

10. The stand of claim 9, wherein said switch member is rotatably movable between its extended and retracted configurations.

11. A foot pedal assembly (100) for moving a retractable wheel assembly (20) between a stowed configuration and a deployed configuration, the foot pedal assembly comprising:
   a foot pedal (150) having opposed proximal (152) and distal (154) ends;
   a first pin (110) coupled to said proximal end of said foot pedal;
   a cam assembly (200) having a cam lever (210) coupled to said first pin;
   a second pin (120) extending from a first portion (212) of said cam lever; and
   a raceway body (300) defining a raceway and first (330) and second (340) recessed areas, a first portion (310) of said raceway extending from said first recessed area and a second portion (320) of said raceway extending from said second recessed area, wherein said second pin is configured to extend into said raceway and said recessed areas, and wherein said foot pedal assembly is moveable between a first and second configuration by moving said second pin in a first direction along said raceway.

12. The foot pedal assembly of claim 11, wherein moving said foot pedal assembly from its first configuration towards its second configuration comprises moving said second pin from a first recessed area (330) into a first portion (310) of said raceway and moving said second pin in the first direction through said raceway towards a second recessed area (340).

13. The foot pedal assembly of claim 12, wherein moving said foot pedal assembly from its second configuration towards its first configuration comprises moving said second pin from said second recessed area into a second portion (320) of said raceway and moving said second pin in the first direction through said raceway towards said first recessed area.

14. The foot pedal assembly of claim 13, wherein said raceway body comprises a switch assembly (350) that is configured to prevent said second pin from traveling in the second direction while said second pin is moving away from said first recessed area.

15. The foot pedal assembly of claim 14, wherein said switch assembly comprises a switch member (352) that is movable between extended and retracted configurations, said switch member being configured to prevent said second pin from entering said second portion of said raceway while said second pin is moving away from said first recessed area.

16. The foot pedal assembly of claim 15, wherein said switch assembly further comprises a biasing member (354) for biasing said switch member towards its extended configuration.

17. The foot pedal assembly of claim 16, wherein said foot pedal assembly is configured such that said second pin biases said switch member towards its retracted configuration as said second pin travels in the first direction past said switch member towards said first recessed area.

18. The foot pedal assembly of claim 17, wherein said switch member is rotatably movable between its extended and retracted configurations.

19. The foot pedal assembly of claim 11, wherein a position of said foot pedal (150) is adjustable.

20. The foot pedal assembly of claim 19 further comprising opposing set screws located in said foot pedal (150) to allow for angular adjustment of foot pedal (150) about said first pin (110).

21. A method of moving a retractable wheel assembly (20) between a stowed configuration and a deployed configuration, the method comprising:

imparting a first downward force onto a distal end (154) of a foot pedal (150) of a foot pedal assembly (100) when the foot pedal assembly is in a first configuration and the wheel assembly is in its stowed configuration, thereby moving the foot pedal assembly towards a second configuration and moving the wheel assembly towards its deployed configuration, and imparting a second downward force onto the distal end of the foot pedal when the foot pedal assembly is in its second configuration and the wheel assembly is in its deployed configuration, thereby moving the foot pedal assembly towards its first configuration and moving the wheel assembly away from its deployed configuration, wherein the foot pedal assembly comprises:

a first pin (110) coupled to a proximal end (152) of the foot pedal;

a cam assembly (200) having a cam lever (210) coupled to the first pin;

a second pin (120) extending from a first portion (212) of the cam lever; and a raceway body (300) defining a raceway and first (330) and second (340) recessed areas, a first portion (310) of the raceway extending from the first recessed area and a second portion (320) of the raceway extending from the second recessed area, wherein the second pin is configured to extend into the raceway and the recessed areas, and wherein the second pin travels in a first direction along the raceway while the foot pedal assembly moves between its first and second configurations.

22. The method of claim 21, further comprising imparting a third downward force onto the distal end of the foot pedal when the foot pedal assembly is in its first configuration and the wheel assembly is in its stowed configuration, thereby causing the second pin to travel in the first direction along the raceway, wherein the raceway body comprises a switch assembly (350) that is configured to prevent the second pin from traveling in the second direction.

* * * * *